(12) United States Patent
Hagihara (10) Patent No.: US 7,472,620 B2
(45) Date of Patent: *Jan. 6, 2009

(54) RESIN DOUBLE HELICAL GEAR AND GEAR TRAIN USING SAME

(75) Inventor: Toru Hagihara, Sayama (JP)

(73) Assignee: Enplas Corporation, Saitama (JP)

( * ) Notice: Subject to any disclaimer, the term of this patent is extended or adjusted under 35 U.S.C. 154(b) by 689 days.

This patent is subject to a terminal disclaimer.

(21) Appl. No.: 10/964,340

(22) Filed: Oct. 12, 2004

(65) Prior Publication Data

US 2005/0081668 A1 Apr. 21, 2005

(30) Foreign Application Priority Data

Oct. 15, 2003 (JP) ............... 2003-355078

(51) Int. Cl.
*F16H 55/18* (2006.01)

(52) U.S. Cl. .......................... 74/458; 74/461

(58) Field of Classification Search .......... 74/458, 74/409, 461, 443
See application file for complete search history.

(56) References Cited

U.S. PATENT DOCUMENTS 3,102,433 A * 9/1963 Stoeckicht ............ 74/410
4,612,816 A * 9/1986 Chalik ................... 74/401
2004/0031152 A1 * 2/2004 Jinkins et al. ........... 29/893

OTHER PUBLICATIONS

"Handbook of Molded Plastic Gears", p. 20 and p. 477, edited by Ad Hoc Committee for Molded Plastic Gear Research of Precision Engineering Institution, pub. Apr. 20, 1995.

* cited by examiner

*Primary Examiner*—Richard W Ridley
*Assistant Examiner*—Terence Boes
(74) *Attorney, Agent, or Firm*—Bachman & LaPointe, P.C.

(57) ABSTRACT

There are provided a resin double helical gear capable of reducing operation noises and vibrations of an image forming system, such as an ink jet printer, which is arranged in the vicinity of an operator, and a gear train using the same and having a smaller number of parts. The gear train 2 for ink jet printer 1 includes a first resin double helical gear 5 which is mounted on an output shaft 4 of a motor 3 so as to be rotatable therewith, and a second resin double helical gear 6 which is mounted on a paper feeding roller shaft 7 so as to be rotatable therewith and which meshes with the first resin double helical gear 5.

7 Claims, 7 Drawing Sheets

RESIN DOUBLE HELICAL GEAR AND GEAR TRAIN USING SAME

BACKGROUND OF THE INVENTION

1. Field of the Invention

The present invention generally relates to a double helical gear (or a herringbone gear) of a resin, and a gear train using the same. More specifically, the invention relates to a resin double helical gear which is widely used for various image forming systems, such as copying machines, facsimile terminal equipments and printers, various automotive parts, such as wiper driving units, power window driving units and auto slide door driving units, various electronic equipments, and precision instruments, and a gear train using the same.

2. Description of the Prior Art

A typical ink jet printer serving as an image forming system is often connected to a personal computer to be used, and is arranged on or near a desk, on which the personal computer is operated, to be operated near an operator, so that it is desired to suppress operation noises and vibrations of the ink jet printer.

Therefore, in conventional ink jet printers, a helical gear is used as each of an output gear of a motor and an idle gear meshing with the output gear, and the contact ratio of the output gear to the idle gear is increased to decrease noises (see, e.g., "Handbook of Molded Plastic Gears", p 22 and p 477, edited by Ad Hoc Committee for Molded Plastic Gear Research of Precision Engineering Institution, published by Sigma Publisher on Apr. 20, 1995). In addition, a spur gear is used as each of a driven gear of a paper feeding roller shaft and an idle gear meshing therewith to prevent thrust force from being applied to the paper feeding roller shaft. Furthermore, if thrust force is applied to the paper feeding roller shaft, a paper feeding transport roller moves so as to be dislocated in the axial directions of the roller shaft. Then, a sheet (a sheet-like recording material, such as a copy paper or a post card) transported by the paper feeding transport roller is transported so as to be dislocated in the axial directions of the paper feeding roller shaft, so that the printing starting position and so forth are deviated to deteriorate the precision of printing.

However, if the helical gears are used as the output gear and the idle gear meshing therewith as conventional ink jet printers, thrust force is applied to both of the gears, so that there are some cases where vibrations are caused by the backlash of the gears and the mounting portion of the rotational shaft rotatably supporting thereon the gears.

Moreover, in the above described ink jet printers, a plurality of idle gears must be arranged between the output gear of the motor and the driven gear of the paper feeding roller shaft, and the number of parts of a gear train is large. Therefore, it is required to reduce the number of the parts in order to reduce the price of the ink jet printers.

SUMMARY OF THE INVENTION

It is therefore an object of the present invention to eliminate the aforementioned problems and to provide a resin double helical gear capable of reducing operation noises and vibrations of an image forming system, such as an ink jet printer, which is arranged in the vicinity of an operator, and a gear train using the same.

It is another object of the present invention to reduce the number of parts of the gear train to reduce the price of the image forming system.

In order to accomplish the aforementioned and other objects, according to one aspect of the present invention, there is provided a resin double helical gear which is mounted on one of a driving shaft and a driven shaft so as to rotatable therewith and which is capable of meshing with another double helical gear mounted on the other shaft, the resin double helical gear comprising: a first gear portion arranged on one side in face width directions from a substantially central portion in the face width directions, the first gear portion having teeth which are helical in a direction; and a second gear portion arranged on the other side in the face width directions from the substantially central portion in the face width directions, the second gear portion having teeth which are helical in a direction opposite to that of the first gear portion, wherein the first gear portion and the second gear portion are molded so as to be integrated with each other in such a shape that a pair of helical gear halves being helical in opposite directions to each other are stuck together.

In this resin double helical gear, a stepped portion of each of teeth between the first and second gear portions may be elastically or plastically deformed to collapse to allow an excess thickness due to deformation of the stepped portion to be received in a space between the resin double helical gear and a companion double helical gear when the resin double helical gear meshes with the companion double helical gear. Each of teeth of the resin double helical gear may have a different helix angle from that of a companion double helical gear meshing therewith. Each of the first and second gear portions may be curved so as to be convex toward a companion double helical gear meshing with the resin double helical gear.

According to another aspect of the present invention, a gear train comprises a first resin double helical gear which is mounted on a driving shaft so as to be rotatable therewith, and a second resin double helical gear which is mounted on a driven shaft so as to be rotatable therewith and which meshes with the first resin double helical gear, each of the first and second resin double helical gears comprising: a first gear portion arranged on one side in face width directions from a substantially central portion in the face width directions, the first gear portion having teeth which are helical in a direction; and a second gear portion arranged on the other side in the face width directions from the substantially central portion in the face width directions, the second gear portion having teeth which are helical in a direction opposite to that of the first gear portion, wherein the first gear portion and the second gear portion are molded so as to be integrated with each other in such a shape that a pair of helical gear halves being helical in opposite directions to each other are stuck together.

In this gear train, a stepped portion of each of teeth of the first resin double helical gear between the first and second gear portions may be elastically or plastically deformed to collapse to allow an excess thickness due to deformation of the stepped portion to be received in a space between the first resin double helical gear and the second resin double helical gear when the first resin double helical gear meshes with the second resin double helical gear. Each of teeth of the first resin double helical gear may have a different helix angle from that of the second resin double helical gear. Each of the first and second gear portions of the second resin double helical gear may be curved so as to be convex toward the first resin double helical gear. The first resin double helical gear may have a greater face width than that of the second resin double helical gear.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiment of the present invention will be described below in detail.

Figure 1:
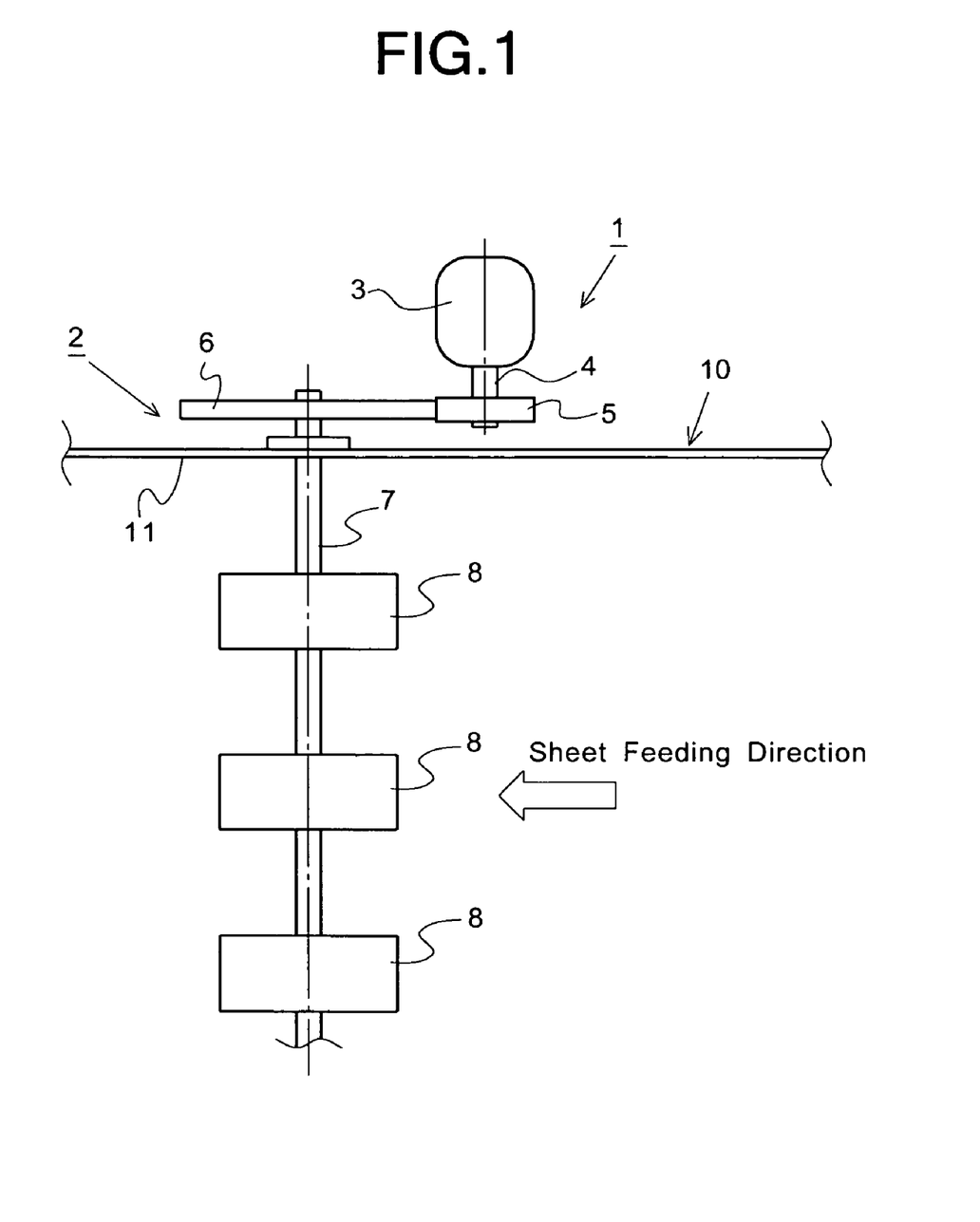
FIG. 1 is a schematic diagram showing the preferred embodiment of a gear train of an ink jet printer according to the present invention.

FIG. 1 is a schematic diagram showing a gear train 2 of an ink jet printer (an image forming system) 1 in the preferred embodiment according to the present invention. As shown in this figure, the gear train 2 of the ink jet printer 1 in this preferred embodiment comprises a first resin double helical gear 5 mounted on an output shaft 4 of a motor 3 so as to be rotatable therewith, and a second resin double helical gear 6 meshing with the first resin double helical gear 5. The second resin double helical resin 6 is mounted on a paper feeding roller shaft (a driven shaft) 7 so as to be rotatable therewith. The number of teeth of each of the first and second resin double helical gears 5 and 6 is determined by a ratio of the revolving speed of the motor 3 to the revolving speed of the paper feeding roller shaft 7.

On the paper feeding roller shaft 7, a plurality of paper feeding transport rollers 8 are mounted at regular intervals in axial directions (width directions of a paper to be fed). The paper feeding transport rollers 8 are fixed to the paper feeding roller shaft 7 by press fitting or by fixing means (keys serving as detent, screws, or shaft retaining rings serving as sliding preventing means), so as to be rotatable with the paper feeding roller shaft 7. Furthermore, the paper feeding roller shaft 7 is rotatably supported on a frame 11 of a printer body 10 or the like.

In such a gear train 2 of the ink jet printer 1, the rotation of the motor 3 is transmitted to the paper feeding roller shaft 7 via the first resin double helical gear 5 of the output shaft 4 and the second resin double helical gear 6 meshing therewith. The paper feeding roller shaft 7 rotates in the opposite direction to the rotation of the motor 3 at a speed reducing ratio according to a gear ratio of the first resin double helical gear 5 to the second resin double helical gear 6. Thus, a sheet-like recording material (a printing paper, a plastic film or the like) is transported in a sheet transport direction by means of the paper feeding transport rollers 8 rotating with the paper feeding roller shaft 7.

In such a gear train 2 of the ink jet printer 1, since the rotation of the motor 3 is transmitted to the paper feeding roller shaft 7 via the first resin double helical gear 5 and second resin double helical gear 6 meshing therewith, no thrust force is applied to the gear train 2 during the transmission of power, so that it is possible to reduce backlash noises (operation noises) and vibrations due to thrust force. As a result, it is possible to reduce operation noises in the ink jet printer 1.

According to this preferred embodiment, since the gear train 2 comprises the first resin double helical gear 5 on the side of the motor 3, and the second resin double helical gear 6 meshing therewith on the side of the paper feeding roller shaft 7, no thrust force is applied to the paper feeding roller shaft 7 during the transmission of power, so that the paper feeding transport rollers 8 do not move so as to be dislocated in axial directions of the paper feeding roller shaft 7. As a result, the ink jet printer 1 using the gear train 2 in this preferred embodiment can accurately transport a recording material in the sheet transport direction, and can prevent the recording material from being dislocated in a direction perpendicular to the sheet transport direction, so that it is possible to improve the precision of image formation (e.g., the precision of printing of characters).

According to this preferred embodiment, the second resin double helical gear 6 mounted on the paper feeding roller shaft 7 serving as the driven shaft is allowed to mesh with the first resin double helical gear 5 mounted on the output shaft 4 of the motor 3, so that the rotation of the motor 3 is transmitted to the paper feeding roller shaft 7 without using any idle gears. Therefore, it is possible to reduce the number of parts, so that it is possible to reduce the price of the gear train 2 and the ink jet printer 1 having the gear train 2.

Figure 2:
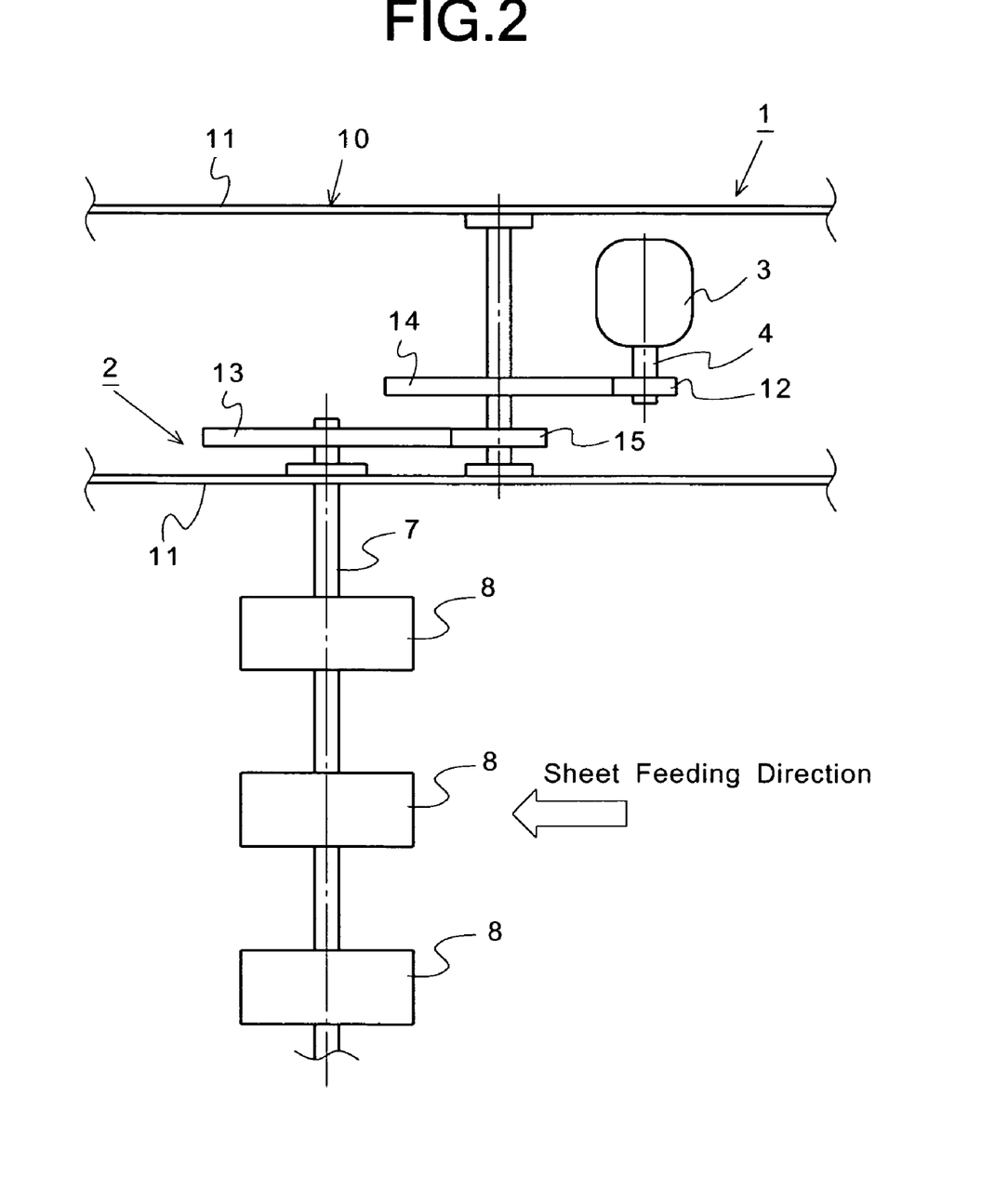
FIG. 2 is a schematic diagram of an example of a gear train to be compared with the gear train of FIG. 1.

According to this preferred embodiment, since the output shaft 4 of the motor 3 is connected to the paper feeding roller shaft 7 via only the first and second resin double helical gears 5 and 6 without using any idle gears, the dimension of the ink jet printer 1 in directions parallel to the paper feeding roller shaft 7 can be smaller than that of an ink jet printer wherein an output gear (resin helical gear) 12 is connected to a driven gear (spur gear) 13 via an idle gear (resin helical gear) 14 and idle gear (spur gear) 15 as shown in FIG. 2. Thus, it is possible to reduce the size of the gear train 2 and the ink jet printer 1 using the gear train 2.

In the ink jet printer 1 using the gear train 2 in this preferred embodiment, a recording material fed from a paper feeding cassette by paper feeding rollers is fed into an image forming section by means of the paper feeding transport rollers 8. Then, ink is sprayed onto the recording material, which is fed into the image forming section, to form an image (to print characters). Thereafter, the recording material on which the image has been formed is delivered to a paper discharging tray.

Figure 3:
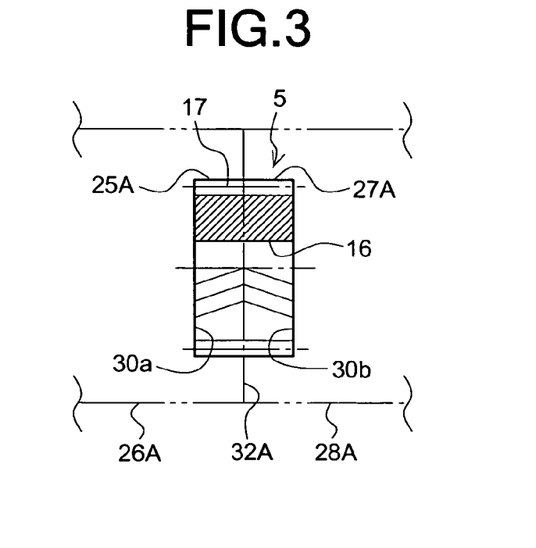
FIG. 3 is a view showing a first resin double helical gear in the preferred embodiment, which shows a cross section of an upper half of the gear.
Figure 4:
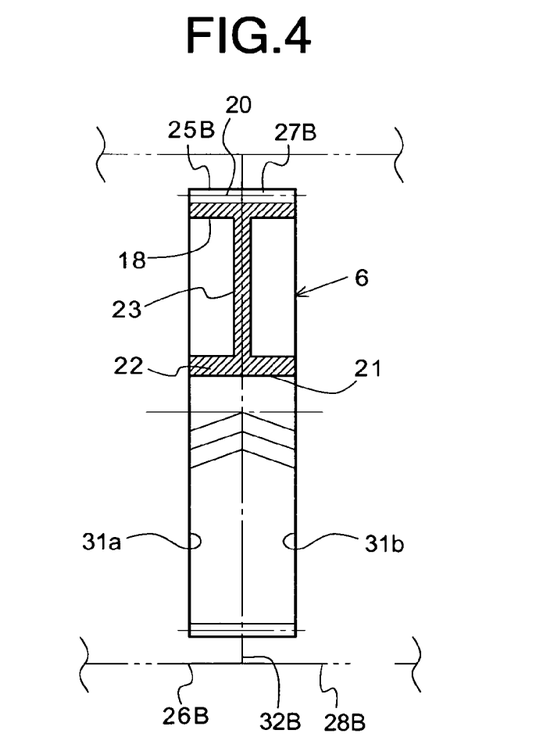
FIG. 4 is a view showing a second resin double helical gear in the preferred embodiment, which shows a cross section of an upper half of the gear.

FIG. 3 shows the first resin double helical gear 5 in this preferred embodiment, and FIG. 4 shows the second resin double helical gear 6 in this preferred embodiment. Each of the first resin double helical gear 5 and second resin double helical gear 6 is molded by injecting the same resin material (polyacetal, polyimide, polycarbonate, ABS resin or the like).

The face width of first resin double helical gear 5 shown in FIG. 3 is slightly grater than the face width of the second resin double helical gear 6. The first resin double helical gear 5 has an axial hole 16 in the rotation central portion thereof, and a large number of teeth 17 on the outer periphery thereof. The output shaft 4 of the motor 3 is press-fitted into the axial hole 16 of the first resin double helical gear 5, so that the first resin double helical gear 5 is designed to rotate with the output shaft 4 of the motor 3 (see FIG. 1).

The second resin double helical gear 6 shown in FIG. 4 has a greater diameter than that of the first resin double helical gear 5. A larger number of teeth 20 than the number of the teeth 17 of the first resin double helical gear 5 are formed on the outer periphery of a rim 18 of the second resin double helical gear 6. The second resin double helical gear 6 has an axial hole 21 in the rotation central portion thereof. In the second resin double helical gear 6, a boss 22 having the axial hole 21 is connected to the rim 18 by means of a substantially disk-shaped web 23. The paper feeding roller shaft 7 is press-fitted into the axial hole 21 of the second resin double helical gear 6, so that the second resin double helical gear 6 is designed to rotate with the paper feeding roller shaft 7 (see FIG. 1).

Figure 5:
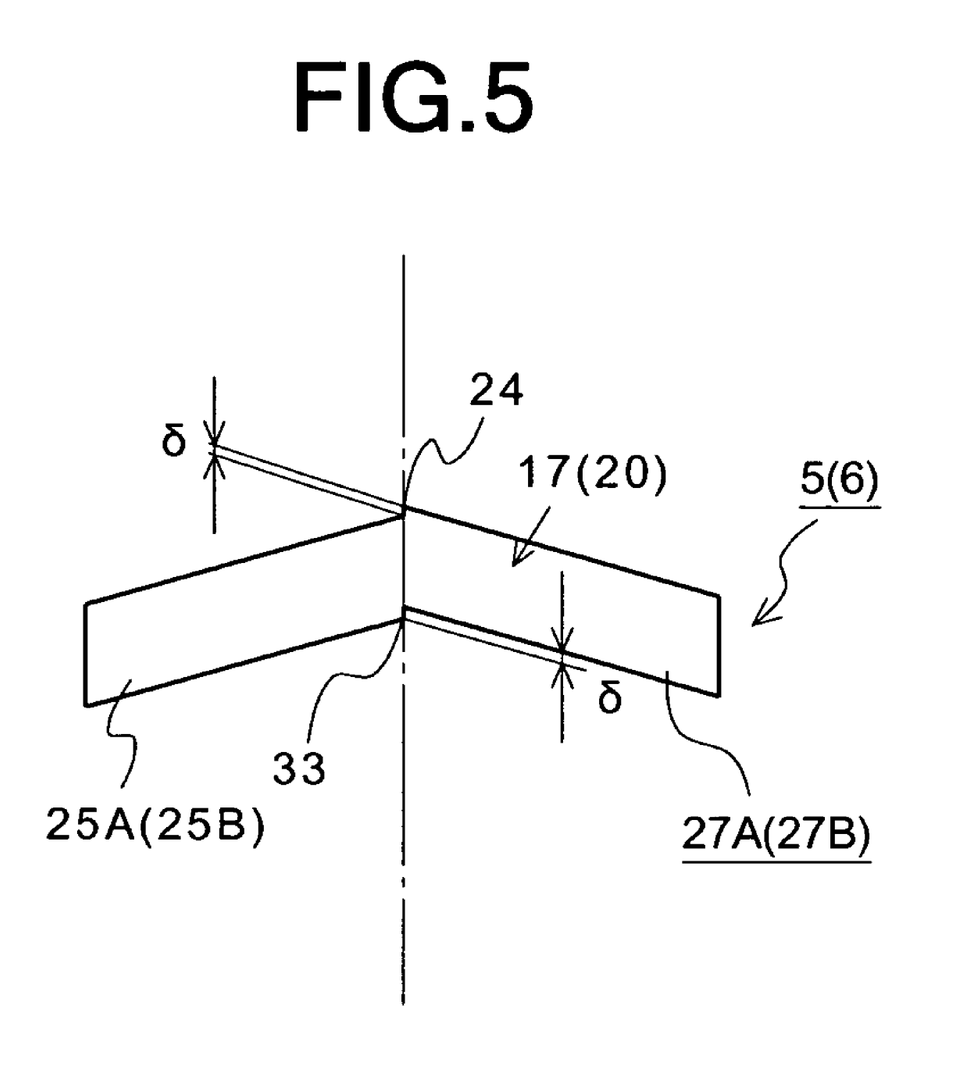
FIG. 5 is a plan view of a tooth of each of the resin double helical gears of FIGS. 3 and 4.

As shown in FIGS. 3 through 5, the teeth 17 and 22 of the first and second resin double helical gears 5 and 6 have such a shape that helical gear halves, which are helical in opposite directions, are stuck together. Each of these resin double helical gears 5, 6 is integrally molded by injecting a resin into cavity 30a, 31a of first die 26A, 26B, which is designed to form a first gear portion 25A, 25B on one side in face width directions from a chevron-shaped top portion 24 in a substantially central portion in face width directions, and into a cavity 30b, 31b of a second die 28A, 28B, which is designed to form a second gear portion 27A, 27B on the other side in the face width directions from the chevron-shaped top portion 24 in the substantially central portion in the face width directions, after causing the first die 26A, 26B to butt the second die 28A, 28B.

In the first and second resin double helical gears 5 and 6 thus formed by injection molding, if the butt surface 32A, 32B between the first die 26A, 26B and second die 28A, 28B is dislocated, the connecting portion of the teeth 17, 20 of the first gear portion 25A, 25B and second gear portion 27A, 27B is also dislocated to produce a stepped portion δ at the top portion 24 of the chevron-shaped teeth 17, 20 and on the reverse 33 thereof as shown in FIG. 5. However, in this preferred embodiment, the stepped portion δ of the teeth 17, 20 can be very small by devising the structure of the injection molding die (the first die 26A, 26B and second die 28A, 28B) and so forth, so that it is possible to transmit power without damaging characteristics as a double helical gear (without producing thrust).

Figure 6A:
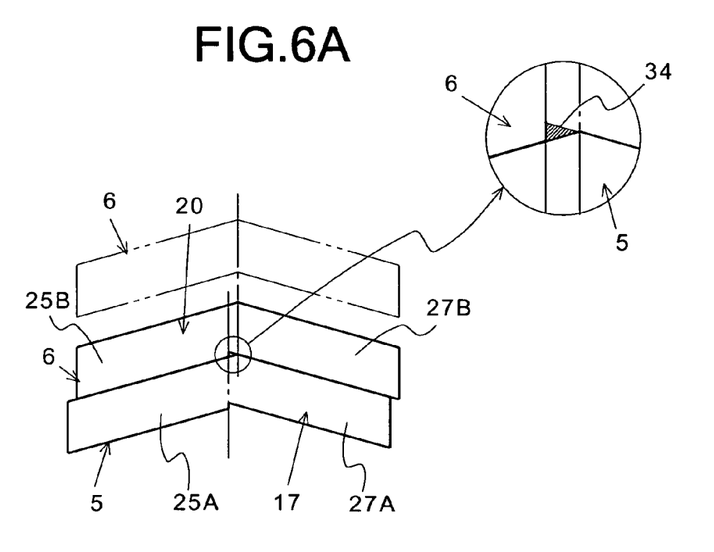
FIGS. 6A through 6C are plan views of teeth showing a meshing state that the first resin double helical gear meshes with the second resin double helical gear in the first preferred embodiment.
Figure 6B:
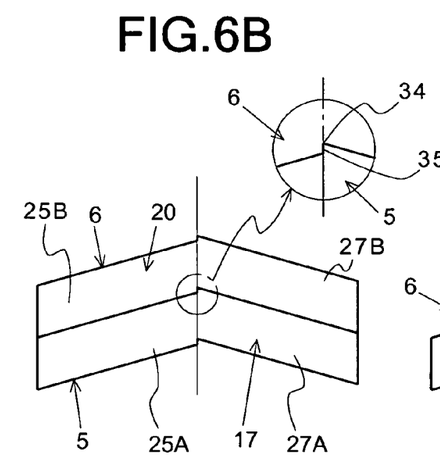
Figure 6C:
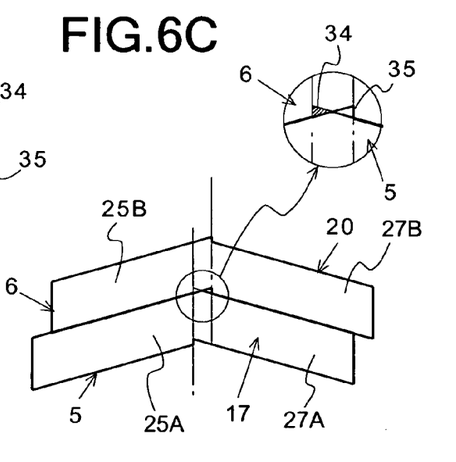

That is, as shown in FIGS. 6A and 6C, the protruding portion (slant line portion) 34 having the very small stepped portion δ of the teeth 17 of the first resin double helical gear 5 locally contacts the teeth 20 of the second resin double helical gear 6 meshing therewith during the transmission of power, so that load to be transmitted concentrates on a very small contact area portion. Therefore, the protruding portion 34 is elastically or plastically deformed to collapse, so that the excess thickness due to the deformation of the protruding portion 34 is received in a space on the tooth crest side, a space on the bottom land side or a space between the gear and the tooth flank of the companion gear. As a result, it is possible to transmit rotation while the teeth 17, 20 of the first gear portions 25A, 25B and second gear portions 27A, 27B of both of the resin double helical gears 5, 6 meshing with each other contact each other (while two surfaces contact each other), respectively, so that it is possible to prevent thrust from being produced during the transmission of power.

Furthermore, FIG. 6A is a plan view showing a meshing state that the teeth 20 of the second resin double helical gear 6 having no stepped portion mesh with the teeth 17 of the first resin double helical gear 5 having the stepped portion. In this state shown in FIG. 6A, the protruding portion 34 of the very small stepped portion is collapsed by transmission load, so that the excess thickness due to the deformation of the protruding portion 34 is received in a space on the tooth crest or bottom land side.

FIG. 6B is a plan view of the teeth 17 and 20 showing a meshing state in a case where the teeth 17 and 20 of both of the resin double helical gears 5 and 6 meshing with each other have the same shape (the stepped portion δ shown in FIG. 5 has the same shape). In the state shown in FIG. 6B, since the protruding portion 34 of the stepped portion of one of the tooth flanks meshing with each other is fitted into the recessed portion 35 of the stepped portion of the other tooth flank, the protruding portion 34 of the stepped portion δ (see FIG. 5) does not collapse, so that the teeth 17, 20 of the first gear portions 25A, 25B and second gear portions 27A, 27B of both of the resin double helical gears 5, 6 meshing with each other contact each other, respectively.

FIG. 6C is a plan view of the teeth 17 and 20 showing a meshing state in a case where the shape of the dislocation (stepped portion) of the second resin double helical gear 6 meshing with the first resin double helical gear 5 is reverse to the shape of the dislocation (stepped portion) of the first resin double helical gear 5. In this state shown in FIG. 6C, the protruding portion 34 of the very small stepped portion on the side of the first resin double helical gear 5 is collapsed by transmission load, so that the excess thickness due to the deformation of the protruding portion 34 is received in a space on the tooth crest side, a space on the bottom land side or the recessed portion 35 of the stepped portion on the side of the second resin double helical gear 6.

According to the first and second resin double helical gears 5 and 6 with such a construction, it is possible to silently transmit a large torque without producing thrust.

If the first and second resin double helical gears 5 and 6 in this preferred embodiment are substituted for metal double helical gears, it is possible to lighten the gear train 2 and the ink jet printer 1 using the gear train 2.

Since the first and second resin double helical gears 5 and 6 in this preferred embodiment produce no thrust force, the thickness of the web 23 of the second resin double helical gear 6 can be smaller than that of a resin helical gear, and it is also possible to omit the radial rib for reinforcing the web 23 of the second resin double helical gear 6.

Since the teeth 17 and 20 of the first and second resin double helical gears 5 and 6 in this preferred embodiment are formed so as to continuously extend in face width directions, respectively, the strength and contact ratio of the teeth 17 and 20 are higher than those in a case where discontinuous portions, such as slits, are formed in the boundary portion between the first gear portions 25A, 25B and second gear portions 27A, 27B so as to separate the first gear portions 25A, 25B from the second gear portions 27A, 27B, respectively.

Figure 7A:
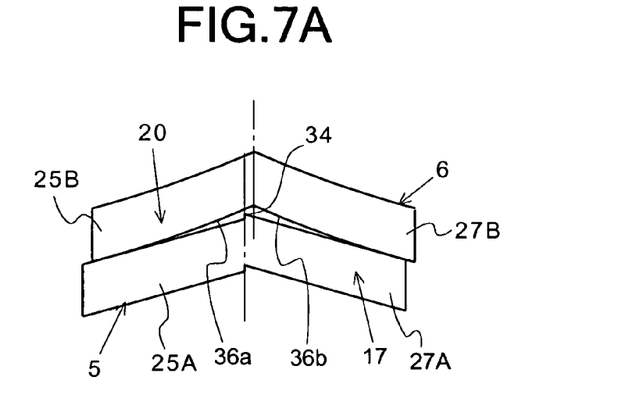
FIGS. 7A through 7C are plan views of teeth showing a first modified example of a meshing state that the first resin double helical gear meshes with the second resin double helical gear in the first preferred embodiment.
Figure 7B:
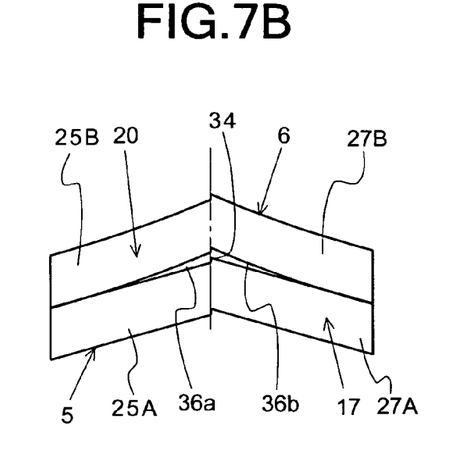
Figure 7C:
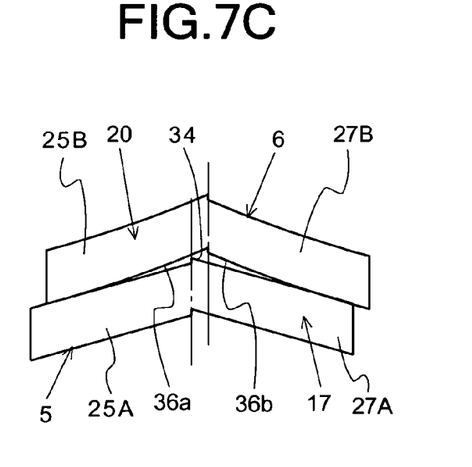

FIGS. 7A through 7C show a first modified example of the above described preferred embodiment. In this example, the helix angle of the teeth 20 of the second resin double helical gear 6 is larger than the helix angle of the teeth 17 of the first resin double helical gear 5. That is, the helix angle of the second resin double helical gear 6 is determined so as to prevent the tooth flanks 36a and 36b of the second resin double helical gear 6 from contacting the stepped portion (the protruding portion 34) of the first resin double helical gear 5 and so as to cause the end portions of the first and second gear portions 25B and 27B of the second resin double helical gear 6 on both sides of the tooth flanks 36a and 36b in face width directions to contact the first and second gear portions 25A and 27A of the first resin double helical gear 5.

Furthermore, FIG. 7A is a plan view of the teeth 17 and 20 showing a meshing state in a case where the second resin double helical gear 6 meshing the first resin double helical gear 5 has no stepped portion although the first resin double helical gear 5 has the stepped portion δ (see FIG. 5). FIG. 7B is a plan view of the teeth 17 and 20 showing a meshing state in a case where both of the resin double helical gears 5 and 6 meshing with each other have stepped portions having the same shape. FIG. 7C is a plan view of the teeth 17 and 20 showing a meshing state in a case where the shape of the dislocation (stepped portion) of the second resin double helical gear 6 is reverse to the shape of the dislocation (stepped portion) of the first resin double helical gear 5. In all of such states, according to this modified example, the first gear portions 25A, 25B and second gear portions 27A, 27B of both of the resin double helical gears 5 and 6 contact each other, respectively, so that it is possible to transmit power without producing thrust.

Figure 8A:
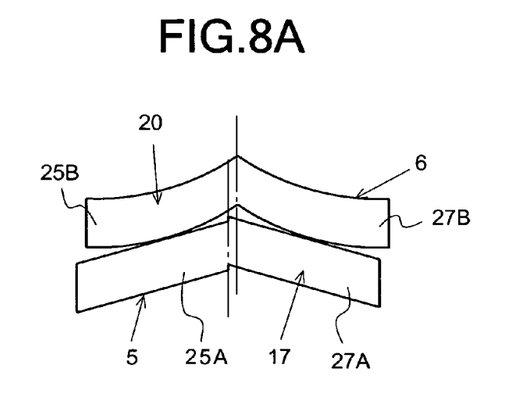
FIGS. 8A through 8C are plan views of teeth showing a second modified example of a meshing state that the first resin double helical gear meshes with the second resin double helical gear in the first preferred embodiment.
Figure 8B:
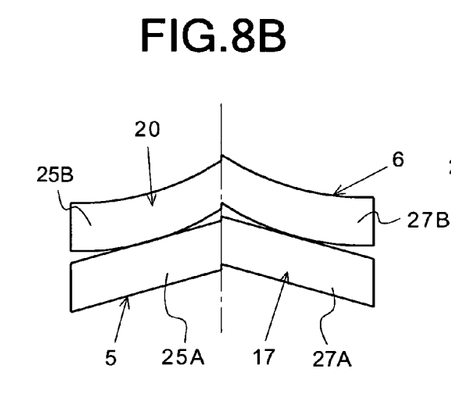
Figure 8C:
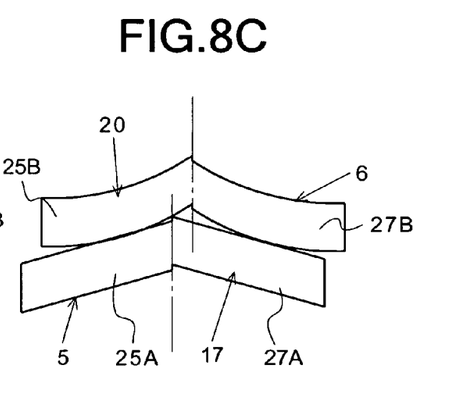

FIGS. 8A through 8C show a second modified example of the above described preferred embodiment. In this example, the first and second gear portions 25B and 27B of the second resin double helical gear 6 are curved so as to be convex toward the first double helical gear 5. If the teeth 20 of the second resin double helical gear 6 are thus formed, the central portion of the teeth 20 of the first and second gear portions 25A and 27B of the second resin double helical gear 6 can contact the teeth 17 of the first resin double helical gear 5, so that it is possible to transmit power without producing thrust.

As describe above, according to the present invention, since power is transmitted from the first resin double helical gear, which is mounted on the output shaft of the motor, to the second resin double helical gear which is mounted on the driven shaft, no thrust force is applied to the gear train during the transmission of power, so that it is possible to prevent noises and vibrations from being produced by thrust force.

According to the present invention, since the gear train comprises the first resin double helical gear on the side of the motor, and the second resin double helical gear meshing therewith on the side of the paper feeding roller shaft, no thrust force is applied to the paper feeding roller shaft during the transmission of power, so that the paper feeding transport roller does not move so as to be dislocated in axial directions of the paper feeding roller shaft 7.

According to the present invention, the second resin double helical gear mounted on the paper feeding roller shaft serving as the driven shaft is allowed to mesh with the first resin double helical gear mounted on the output shaft of the motor, so that the rotation of the motor is transmitted to the paper feeding roller shaft without using any idle gears. Therefore, it is possible to reduce the number of parts, so that it is possible to reduce the price of the gear train and the ink jet printer having the gear train.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A resin double helical gear which is mounted on one of a driving shaft and a driven shaft so as to rotatable therewith and which is capable of meshing with another double helical gear mounted on the other shaft, said resin double helical gear comprising:
   a first gear portion in the shape of a helical gear arranged on one side in face width directions from a substantially central portion in the face width directions, said first gear portion having teeth which are helical in a direction; and
   a second gear portion in the shape of a helical gear arranged on the other side in the face width directions from the substantially central portion in the face width directions, said second gear portion having teeth which are helical in a direction opposite to that of said first gear portion,
   wherein said first gear portion and said second gear portion are molded to be integrated with each other so that each of said teeth of said first gear portion and a corresponding one of said teeth of said second gear portion continuously extend in face width directions, and
   wherein each of said teeth of said first and second gear portions has a different helix angle from that of a corresponding one of teeth of a companion double helical gear meshing therewith.

2. A resin double helical gear as set forth in claim 1, wherein a stepped portion of each of teeth between said first and second gear portions is elastically or plastically deformed to collapse to allow an excess thickness due to deformation of said stepped portion to be received in a space between said resin double helical gear and a companion double helical gear when said resin double helical gear meshes with said companion double helical gear.

3. A resin double helical gear as set forth in claim 1, wherein each of said first and second gear portions is curved so as to be convex toward a companion double helical gear meshing with said resin double helical gear.

4. A gear train comprising a first resin double helical gear which is mounted on a driving shaft so as to be rotatable therewith, and a second resin double helical gear which is mounted on a driven shaft so as to be rotatable therewith and which meshes with said first resin double helical gear, each of said first and second resin double helical gears comprising:
   a first gear portion in the shape of a helical gear arranged on one side in face width directions from a substantially central portion in the face width directions, said first gear portion having teeth which are helical in a direction; and
   a second gear portion in the shape of a helical gear arranged on the other side in the face width directions from the substantially central portion in the face width directions, said second gear portion having teeth which are helical in a direction opposite to that of said first gear portion,
   wherein said first gear portion and said second gear portion are molded to be integrated with each other so that each of said teeth of said first gear portion and a corresponding one of said teeth of said second gear portion continuously extend in face width directions, and wherein each of said teeth of said first and second gear portions of said first resin double helical gear has a different helix angle from that of a corresponding one of said teeth of said first and second gear portions of said second resin double helical gear meshing therewith.

5. A gear train as set forth in claim 4, wherein a stepped portion of each of teeth of said first resin double helical gear between said first and second gear portions is elastically or plastically deformed to collapse to allow an excess thickness due to deformation of said stepped portion to be received in a space between said first resin double helical gear and said second resin double helical gear when said first resin double helical gear meshes with said second resin double helical gear.

6. A gear train as set forth in claim 4, wherein each of said first and second gear portions of said second resin double helical gear is curved so as to be convex toward said first resin double helical gear.

7. A gear train as set forth in claim 4, wherein said first resin double helical gear has a greater face width than that of said second resin double helical gear.

* * * * *